United States Patent [19]

Giberson

[11] Patent Number: 5,331,811
[45] Date of Patent: Jul. 26, 1994

[54] FLUID DRIVE

[76] Inventor: Melbourne F. Giberson, 5 Spring Mill La., Haverford, Pa. 19041

[21] Appl. No.: 16,784

[22] Filed: Feb. 11, 1993

[51] Int. Cl.⁵ .............................................. F16D 33/00
[52] U.S. Cl. ..................................... 60/330; 416/180; 29/889.5
[58] Field of Search ................ 60/330, 338, 347, 364, 60/365; 416/180; 29/889.5

[56] References Cited

U.S. PATENT DOCUMENTS

| 2,031,521 | 2/1936 | Baumann et al. | 29/889.5 |
| 2,140,106 | 12/1938 | Cox et al. | 29/889.5 |
| 2,473,185 | 6/1949 | Weiss | 29/889.5 |
| 2,763,215 | 9/1956 | Misch | 29/889.5 |
| 2,998,782 | 9/1961 | Ryan et al. | 416/180 |
| 3,783,483 | 1/1974 | Ivey | 29/889.5 X |
| 3,940,929 | 3/1976 | Bezimensky | 60/338 X |
| 4,825,521 | 5/1989 | Frotschner et al. | 416/180 X |

OTHER PUBLICATIONS

Fottinger-Kupplungen und Fottinger-Getriebe, Ernest Kickbusch, Springer-Verlag, Berlin: 1963.
Stomung S. Kupplungen und Stromungs Wandler, Maurizio Wolf, Springer-Verlag, Berlin 1962.

*Primary Examiner*—Edward K. Look
*Assistant Examiner*—Hoang Nguyen
*Attorney, Agent, or Firm*—Polster, Lieder, Woodruff & Lucchesi

[57] ABSTRACT

A fluid drive system in which a forged alloy steel impeller rotated by an input shaft at a constant speed drives a runner through a fluidic coupling, wherein selectively variable differential speed between the impeller and runner is produced by varying the amount of oil between the impeller and runner, wherein both the impeller and runner have radially extending vanes between them defining pockets between them with a bottom surface, the impeller is provided with reinforcing elements integral with the vanes, each reinforcing element spanning a pocket and being clear of the bottom surface. The runner can also be provided with such elements. In any case, the vanes and reinforcing elements are machined from a forged alloy steel billet, by a multi-axis Computer Numerical Controlled (CNC) milling machine under three-dimensional control with specialized tooling. The vanes can be planar but at an angle either to the face or to the radius, or vanes which are curved, or twisted, as required to optimize the fluid performance of the fluid drive can be provided. Preferably, the impeller and runner are provided with facing lips at a rim section, the lips projecting toward one another in direct confrontation beyond a plane defined by free edges of the vanes. Also preferably, the free edges of the vanes are rounded on a radius about half of the width of the free edge before being rounded.

21 Claims, 4 Drawing Sheets

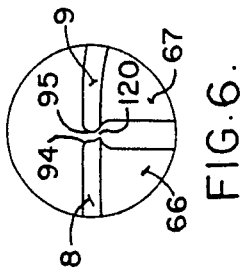
FIG. 1.
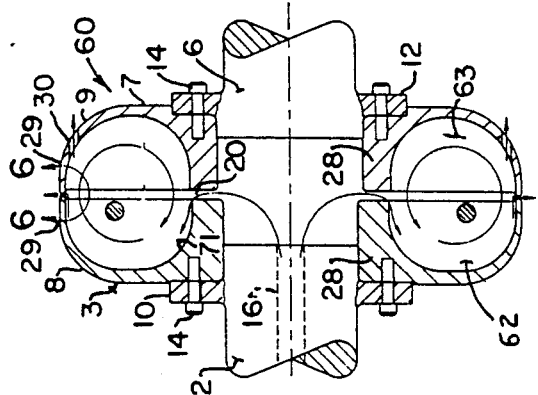
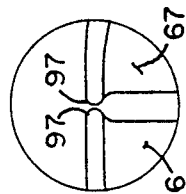
FIG. 6.
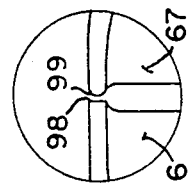
FIG. 9.
FIG. 2.
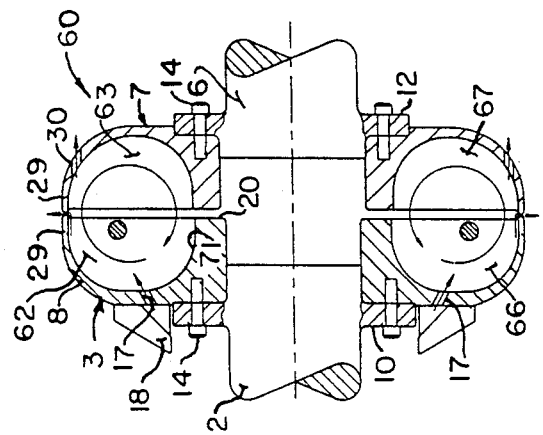
FIG. 8.
FIG. 7.
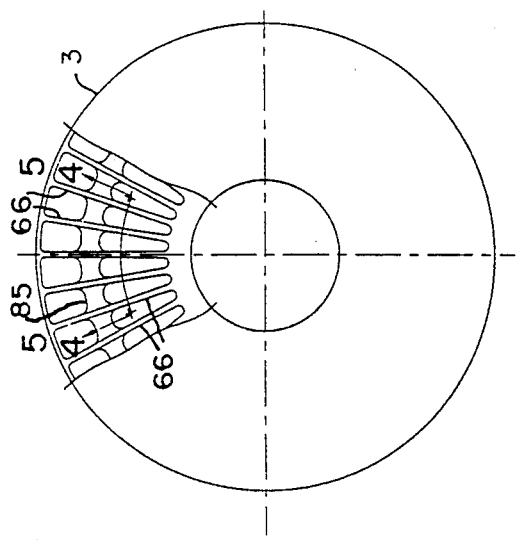
FIG. 3.
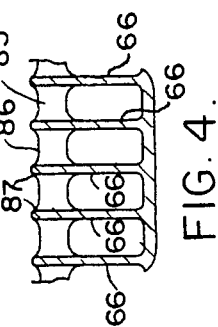
FIG. 4.
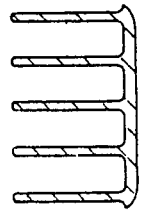
FIG. 5.

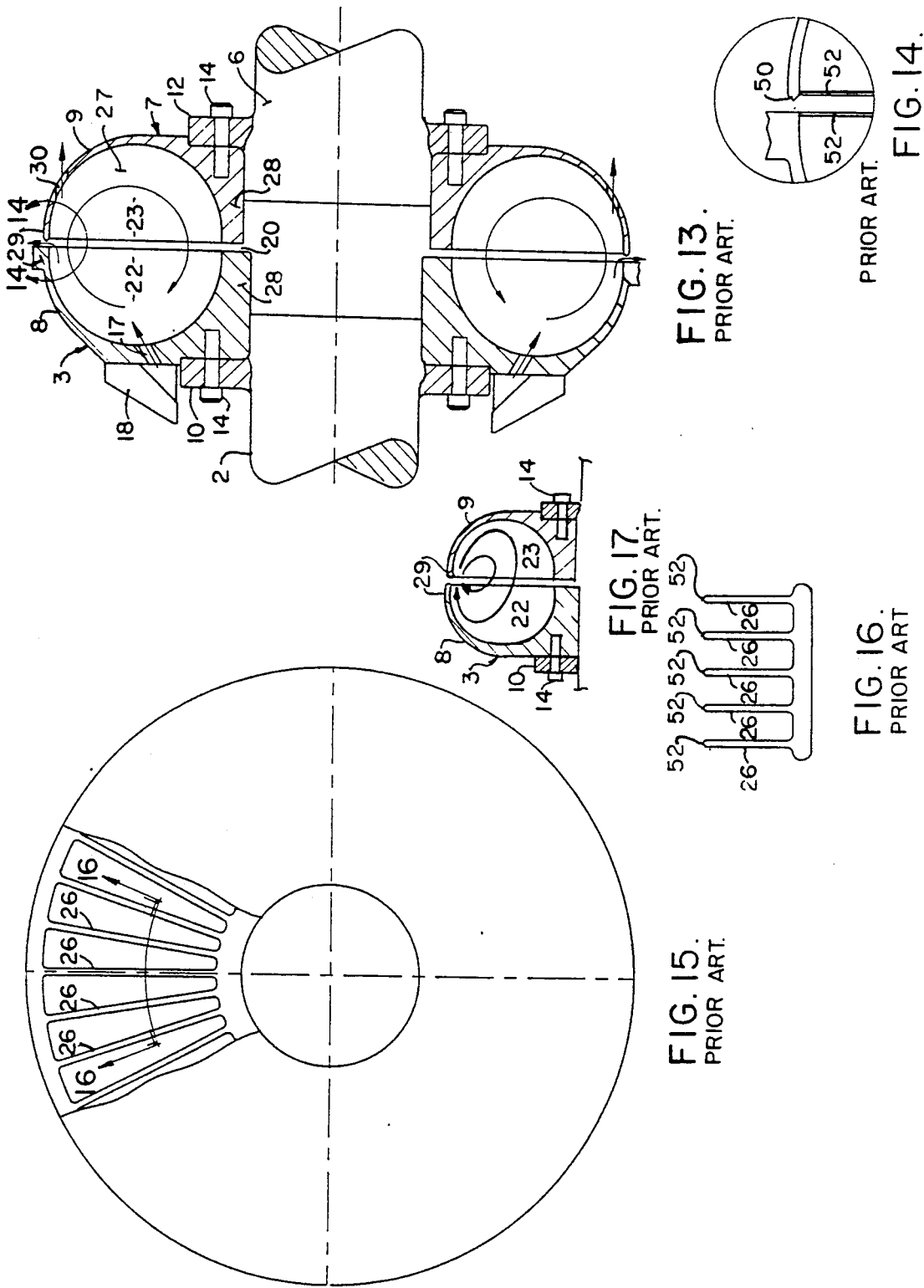

FLUID DRIVE

BACKGROUND OF THE INVENTION

Fluid drives, which are sometimes called fluid couplings or hydraulic couplings, are commonly used as clutches of sorts to transmit power smoothly between a power source driving an impeller, and a mechanism to be driven, which is connected to a runner. In most of these applications, such as automotive drive trains, the impeller and runner are fluidically coupled in a chamber that is substantially filled with oil at all times, acceleration or deceleration of the driven mechanism being accomplished by the acceleration or deceleration of the engine driving the impeller. These are relatively low power applications, for which the impellers and runners are frequently made of sheet metal stampings or are cast.

All fluid drive impellers and runners have vanes which generally extend radially, defining pockets between them. The cavities formed by the pockets of the impeller and of the runner and the gap between them contain oil. This oil tends to be thrown radially outwardly by centrifugal force, more so by the impeller than by the runner, because the impeller rotates faster. This produces a circulation pattern within and between the pockets of the impeller and runner, where the oil is thrown by the vanes of the rotating impeller against the vanes of the runner, causing the runner to rotate. The leading surface of each vane of the impeller is a high pressure surface, and the trailing surface of each impeller vane is a low pressure surface. As the oil flows radially outwardly through an impeller pocket, it tends to separate from the low pressure surface and to flow with higher velocity along the high pressure surface, forming a jet, one jet per pocket, so that the oil enters the runner as a series of high velocity oil jets. This is in contrast to an ideal uniform flow of oil exiting the impeller and entering the runner.

Two references that cover fluid drives from both the theoretical and practical points of view are Fottinger-Kupplungen und Fottinger-Getriebe, Ernst Kickbusch, Springer-Verlag, Berlin, 1963, and Stromungskupplungen und Stromungswandler, Maurizio Wolf, Springer-Verlag, Berlin, 1962. The effect of fluid performance of planer vanes as a function of the angle relative to the face is discussed in both of these references. They indicate that an angle of approximately 30 degrees to the face maximizes the power achieved from a given impeller diameter.

Conventional fluid drive impellers and runners for high power industrial applications have vanes that are purely radial so that they can be used for either clockwise or counter-clockwise rotational applications, Further, the conventional process of making pockets with over-center milling cutters requires that the sides of the vanes be purely planar.

Generally, the number of vanes, hence the number of pockets, of the impeller is different from the number of vanes on the runner. This is done to spread the pulsing effect of the jets over different vanes, reducing the magnitude of the alternating stresses induced in the vanes. It has generally been considered to be desirable to position the impeller and runner so that the gap between them is as small as possible in order to increase the efficiency of the drive. At the same time, the magnitude of the jet pulsing effect increases with a narrower gap. With a sufficiently narrow gap, this leads to fatigue of the vanes, often leading to their failure. In order to reinforce the vanes, reinforcing rings have been bolted, welded, brazed, or cast intermediate the radial reach of the vanes; the vanes have been made uniformly thicker; and/or the impellers have been made of material with improved mechanical properties. This has been possible in the low power applications, such as automotive fluid drive applications, in which it is possible to use sheet metal or cast impellers and runners. It has also been possible in the industrial fluid drives that are not subjected to severe duty applications.

It should be noted that in some applications, the "reinforcing ring" has a second and perhaps more important function of controlling the oil flow pattern. In the fluid dynamic literature, this ring is called the "core".

The system of this invention has to do with industrial fluid drives transmitting power of a different order of magnitude from that of automotive and other relatively low pressure, low torque applications, usually under severe duty applications. The fluid drives to which this invention relates generally transmit more than 4,000 and up to 15,000 horsepower or higher, per impeller/runner pair at a nominal input speed of 3600 rpm, and generally are subjected to severe duty applications. As used here, "severe duty" implies high torque transmission with high differential speed, or high slip speed, between the impeller rotative speed and the runner rotative speed in continuous operation for years. The problems associated with high powered fluid drives of the type to which this invention is addressed are quite different from those of the low power type and from those which do not experience high differential speed between the impeller and runner.

As indicated just above, the fluid drives to which this invention relates, are designed to provide a variable output shaft speed from a constant input speed. For example, a turbine rotating at a constant speed of 3600 rpm drives a fluid drive which drives a boiler feed water pump at a rotative speed in the range between approximately 3500 rpm and 800 rpm. In this example, if the pump absorbs 14,600 horsepower with the pump speed and fluid drive output shaft speed at 3,500 rpm., then the turbine will supply approximately 15,000 horsepower to the input shaft and impeller of the fluid drive. When the boiler feed pump and fluid drive output shaft rotate at 800 rpm, the pump absorbs perhaps 200 horsepower, with an input power from the turbine of 900 hp. The variable speed of the driven machine is accomplished by varying the amount of oil in the cavity in and around the impeller and runner, conventionally by means of a scoop tube. Parasite losses related to bearings and the scoop tube are not included in the above power figures, which are merely illustrative, and form no part of the invention.

The impeller and runner of a high powered fluid drive to which this invention is addressed are machined from billets or blanks of alloy steel forgings, and this applies to both the conventional designs and the improved designs of this invention. Conventionally, the free edges of the vanes of the impeller are notched to receive a reinforcing ring that engages the vanes at the free edges, with long bolts retaining the reinforcing ring into the impeller vanes. However, the bolts tend to break or loosen, and their use has proved to be hazardous to the long term operation of the fluid drive. In all non-severe duty applications, the vanes are generally not provided with reinforcing rings. Prior to this invention, the use of the reinforcing rings that are bolted in place has been considered the best design for minimizing the probability of breakage of the vanes under severe-duty applications, that is, when high differential speed conditions exist.

The metallurgical properties of the alloy steel forgings and the severe duty of these impellers and runners do not permit welding, brazing, or similar attachment of reinforcing rings to the vanes.

In all fluid drives, heat is generated in the oil due to the inefficiency of the process, being related to the torque transmitted times the differential speed. In the case of these high power fluid drives, the power loss, or the heat generated in the oil, can amount to 200 to 4000 horsepower per circuit, that is, per one impeller and its mating runner. Accordingly, a continuous flow of oil through the circuit is used to carry away the heat, otherwise it would overheat so severely as to be unserviceable.

Conventionally, there are several methods for delivering oil into the circuit, that is, into the impeller and runner cavity: One method is for the oil to enter either through hole(s) in the input shaft and/or hole(s) in the output shaft and then outwardly into the gap between the runner and impeller. Another is for the oil to enter a collection ring attached to and rotating with the impeller, commonly called an impeller oil pump, and then through holes in the shroud. Nothing of this improvement affects the method of delivering oil into the circuit.

Conventionally, the oil leaves the circuit through the gap between the outer surfaces, or shrouds, of the impeller and of the runner, and/or through holes in the shroud of the impeller or runner at some distance from the free edges of the impeller or runner vanes, respectively.

However, certain aspects of this invention address the flow path and the sealing of the oil as it exits the circuit. Conventionally, the surface which forms the shroud on the outer perimeter of the impeller pockets terminates at the plane transverse of the axis of rotation of the impeller which contains the free edges of the impeller vanes. Conventionally, for the runner shroud, there are two designs. In one design, the shroud on the outer perimeter of the runner pockets terminates similarly to that of the conventional impeller, that is, the runner shroud terminates at the plane transverse of the axis of rotation of the runner and which is defined by the free edges of the runner vanes. In the second design, the shroud terminates in a lip in the form of a Vee, with the sharp point of the Vee protruding approximately ⅛" beyond the transverse plane containing the free edges of the runner vanes.

Conventionally then, in the first design, the gap between the impeller and runner shrouds is the same as the gap between the free edges of the impeller and the runner vanes. In the second design, there is a Vee shaped lip on the runner, so that the gap between the shrouds is slightly (e.g. ⅛") smaller than the gap between the free edges of the vanes.

In addition to acting as a structural support for the vanes, the shrouds serve as a seal on the flow of the high velocity, high energy oil, as it exits through the gap between the impeller and the runner shrouds. Clearly, the smaller the gap, the better the seal, and the more efficient the circuit is. This is the justification for designing this sealing gap so that it is no larger than necessary (a) to prevent contact of the impeller and runner due to (1) vibration, (2) axial movement in the thrust bearings, and/or (3) thermal growth, and (b) to pass only the oil flow desired through this exit flow path.

On the other hand, as indicated above, the size of the gap between the free edges of the vanes influences the magnitude of the oil jet pulsing effect as the oil passes from the impeller to the runner and again, from the runner to the impeller.

Conventionally, for the industrial fluid drives, the pockets have been formed by several methods. One is by casting; another is by welding, brazing or similarly attaching the vanes to the shroud or pocket casing, and another is by milling out with a circular, multi-toothed milling cutter which can reach over the center of the cutter.

In the casting method, a pocket of any shape can be made, and it can contain a reinforcing ring, cast in, or, depending upon the material, one can be brazed in or welded in. The problem with cast materials is that they do not have the high strength mechanical properties suitable for the severe duty applications to which this invention is addressed.

In the second conventional method, which uses welding, brazing, or the like, a pocket of almost any shape can be made with vanes of almost any shape or orientation, with or without a reinforcing ring attached. However, welded joints, brazed joints or similarly made joints are not adequate, because experience indicates that they will crack and subsequently fail under the severe duty applications addressed in this invention. In the third conventional method, high strength alloy steel blanks are used to obtain suitable mechanical properties, into which the pockets are milled in slices, each slice being the thickness of the milling cutter, on the order of ⅜ inch (9.525 mm) to ½ inch (12.700 mm), two to four slices per pocket, overlapping at the radially inward end of the pocket, and fanning out at the radially outward end of the pocket. This causes the sides of the vanes to be purely planer and conventionally of uniform thickness in both the radial direction and in the axial direction. Because the milling cutter is circular in shape, the bottom of the pocket made by this method is substantially semi-circular in shape. Further, the radius between the pocket bottom and the vane is the same everywhere. Clearly, it is not possible to have an integral reinforcing ring in an impeller made by this method. While this method leaves a compressive layer in the surface as a result of the machining process, which is good, it also leaves tool marks or scratches which must be removed by hand, as these tool marks are very significant "stress risers", particularly in the fillets, from which many cracks have emanated, causing failure of the vanes. When a tool mark occurs, it typically occurs along the entire path that the tool takes along the surface of a vane, the tool forming a generally semi-circular shaped pocket. When such a tool mark occurs in a fillet, it usually occurs along the entire length of the fillet between the side of a vane and the pocket bottom. These tool marks must be removed, and are usually removed using hand tools such as pencil grinders, leading to under-cuts, or thin spots, in the vanes at the intersection of the vanes and the pocket bottoms. These thinner spots in the vanes are themselves stress risers, which also have contributed to vane failures.

One of the objects of this invention is to provide an impeller for a fluid drive system adapted to handle 4,000 hp up to 15,000 hp or more, and to deliver variable speeds over a wide differential speed range, including those described as severe duty: a differential speed of 100 rpm to 2800 rpm, for an input speed of 3600 rpm, and in which the vanes are reinforced in such a way as substantially to eliminate the danger of breakage of the reinforcement.

Another object is to provide such reinforcement that causes little interference with the circulation pattern of the oil.

Another object is to provide an impeller and a runner in which the magnitude of the jet pulsing effect is reduced, while at the same time, providing for maximum sealing of the high velocity, high energy oil as it exits the impeller.

Another object is to provide such a fluid drive in which the impeller vanes, and if desired, the runner vanes are formed to optimize their strength.

Still another object is to provide such a fluid drive in which the impeller vanes, and if desired, the runner vanes are formed to optimize the transition of the oil flow into and from the pockets, hence smoother acceleration or deceleration of the fluid and corresponding transfer of power to the oil and from the oil than has been provided heretofore in fluid drives of the type to which this invention pertains.

Other objects will become apparent to those skilled in the art in the light of the following description and accompanying drawings.

SUMMARY OF THE INVENTION

In accordance with this invention, generally stated, in a fluid drive system in which a forged alloy steel impeller rotated by an input shaft rotated at a constant speed drives a runner, mounted on an output shaft, through a fluidic coupling, wherein a selectively variable differential speed between the impeller and runner is produced by varying the amount of oil between the impeller and runner, wherein both the impeller and runner have radially extending vanes defining pockets between them with a bottom surface, the impeller is provided with reinforcing elements integral with the vanes, each reinforcing element spanning a pocket and being clear of the bottom surface of the pocket. The runner can be provided with similar reinforcing elements, but need not be, in most applications. As used herein, "integral" means that the vanes and the reinforcing elements are part of the same original parent forging blank, the pocket being machined away, leaving the reinforcing element integral with the vanes.

The reinforcing elements are preferably circular or somewhat elliptical in cross-section, smaller in diameter through their longitudinally center reach than at their roots at which they are integral with the vanes.

Also preferably, the radially extending free edges of the vanes of both impeller and runner are rounded on a radius on the order of one-half the width of the vane at its free edge before it is rounded.

It has been found that increasing the gap between the vanes of the impeller and runner a small amount can substantially reduce the magnitude of the jet pulse strength without significantly reducing the efficiency of the drive, provided that the gap between the shrouds of the impeller and runner is kept small.

Accordingly, in the preferred embodiment of this invention, each of the impeller and runner shrouds has an annular seal lip that extends beyond the transverse plane that is co-planer with the free edges of the impeller vanes and of the runner vanes, respectively, to define the gap between the impeller and runner shrouds. This permits independent control of the seal gap at the periphery and of the gap between the free edges of the impeller vanes and runner vanes. In the preferred embodiment, one of the lips is convexly rounded and the other, concavely complementarily to at least a portion of the convexly rounded other lip. However, both of the lips can be rounded, one of the lips can be rounded and the other square with slightly rounded edges, or both can be square with slightly rounded edges, designed to direct the high velocity, high energy flow over the gap as it exits the impeller. Such an arrangement provides for smoother fluid flow than can be achieved by the sharp Vee shape of the runner lip of a conventional design in current use, in which no lip is povided on the impeller.

Also preferably, the vanes are strengthened by increasing the thickness of the vanes radially from their radially outer ends as the vanes approach the hub, and/or as they approach the pocket bottom axially from the free edges of the vanes.

In the preferred embodiment illustrated and described, the runner pockets end at a hub section on a circle of greater radius than the pockets of the impeller, to obviate the need for a separate flow ring and to improve the flow characteristics of the circulating oil.

Also in the preferred embodiment, the shape of the bottom surface of the pockets is not semi-circular, but is formed in a way that the area subtended by each 15 degree arc from the center of the reinforcing spool is substantially the same, within plus or minus 5%, for example, so that the average velocity of the oil as it passes around the spool or reinforcing ring remains approximately constant when the impeller and runner cavities are filled with oil, the path of the oil changing under speed reduction conditions associated with partially filled impeller and runner cavities.

In the preferred embodiment of this invention, the impellers and runners are made using a Computer Numerical Controlled (CNC) milling machine, having five or more axes, under three dimensional programmed computer control, with specially designed tooling. This permits pockets to be made in high strength alloy steel blanks, with vanes of varying shape, e.g., planar, curved, or twisted, of varying angle, of varying thickness, both radially and axially, with varying fillet radii, with pocket bottom surfaces of any shape, and with one or more integral reinforcing rings, or without a reinforcing ring. The machining process leaves compressive stresses in the surface, and leaves a minimum of tool marks in the surfaces, particularly in the fillets. The tool marks that exist are each very local in nature. This makes the polishing process almost completely unnecessary.

DRAWINGS

In the drawing:

FIG. 1 is a view in side elevation, partly in section and partly broken away, of an impeller and runner assembly in accordance with one illustrative embodiment of this invention;

FIG. 2 is a view in side elevation, partly in section and partly broken away, of an impeller and runner assembly in accordance with one illustrative embodiment of this invention, illustrating a different, conventional circulating oil feed arrangement;

FIG. 3 is a view in front elevation of an impeller made in accordance with the preferred embodiment of this invention, broken away to show only a portion of the vane structure, the rest of the vane structure being exactly the same, extending around the entire face of the impeller;

FIG. 4 is a detailed, enlarged view of vanes and reinforcing members, and part of the impeller shroud of the impeller shown in FIG. 3;

FIG. 5 is a view of the vanes and part of the shroud of an impeller or runner corresponding to FIG. 4, but without the reinforcing members;

FIG. 6 is an enlarged detailed view of lips on the impeller and runner;

FIG. 7 is an enlarged detailed view of another form of lips on the impeller and runner;

FIG. 8 is an enlarged detailed view of still another form of lips on the impeller and runner;

FIG. 9 is an enlarged detailed view of yet another form of lips on the impeller and runner;

FIG. 13 is a view in side elevation, partly in section and partly broken away, of another form of conventional impeller and runner assembly;

FIG. 14 is an enlarged detailed view of a lip construction of the device shown in FIG. 13;

FIG. 15 is a view in front elevation of an impeller of the conventional impeller shown in FIG. 13, broken away to show only a portion of the vane structure, the rest of the vane structure being exactly the same, extending around the entire face of the impeller;

FIG. 16 is a sectional view taken along the line 16—16 of FIG. 15;

FIG. 17 is a fragmentary sectional view corresponding to the upper part of FIG. 13, illustrating in a much simplified way a flow pattern representative of that which occurs in partially filled cavities;

The drawings presented here illustrate only the impeller and runner as they are mounted on input and output shafts, respectively. In all cases, both in conventional fluid drives and in the improved fluid drives, there is a casing assembly which is attached to and rotates with the impeller. Because this invention does not address the casing assembly, it is not shown in any of the drawings. A fluid drive with complete casing and related components is shown in my co-pending application Ser. No. 07/998959, filed Dec. 31, 1992, and many are illustrated in the German references cited in the Background of the Invention.

DESCRIPTION OF THE PREFERRED EMBODIMENT

Figure 10:
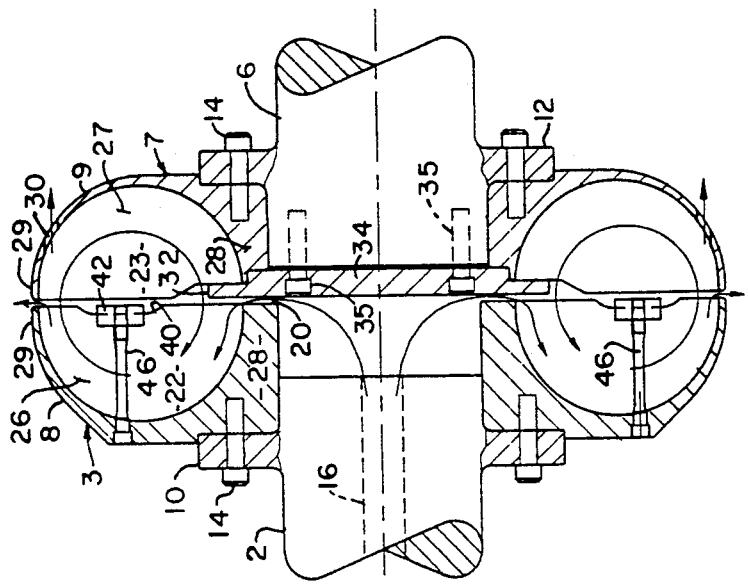
FIG. 10 is a view in side elevation, partly in section and partly broken away, of one form of conventional impeller and runner assembly.
Figure 12:
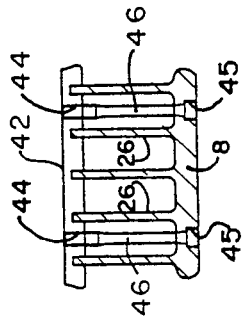
FIG. 12 is a sectional view taken along the line 12—12 of FIG. 11.
Figure 11:
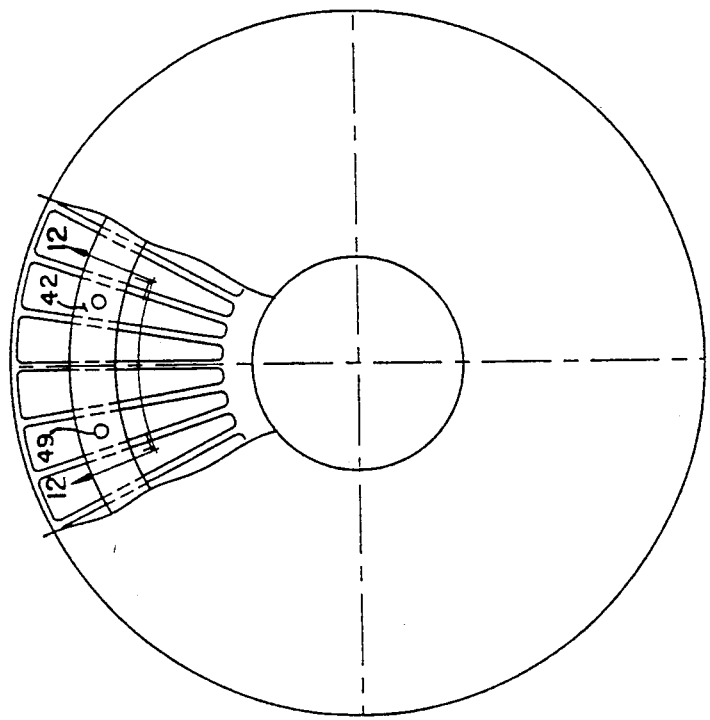
FIG. 11 is a view in front elevation of an impeller of the conventional impeller shown in FIG. 10, broken away to show only a portion of the vane structure, the rest of the vane structure being exactly the same, extending around the entire face of the impeller.
Figure 18:
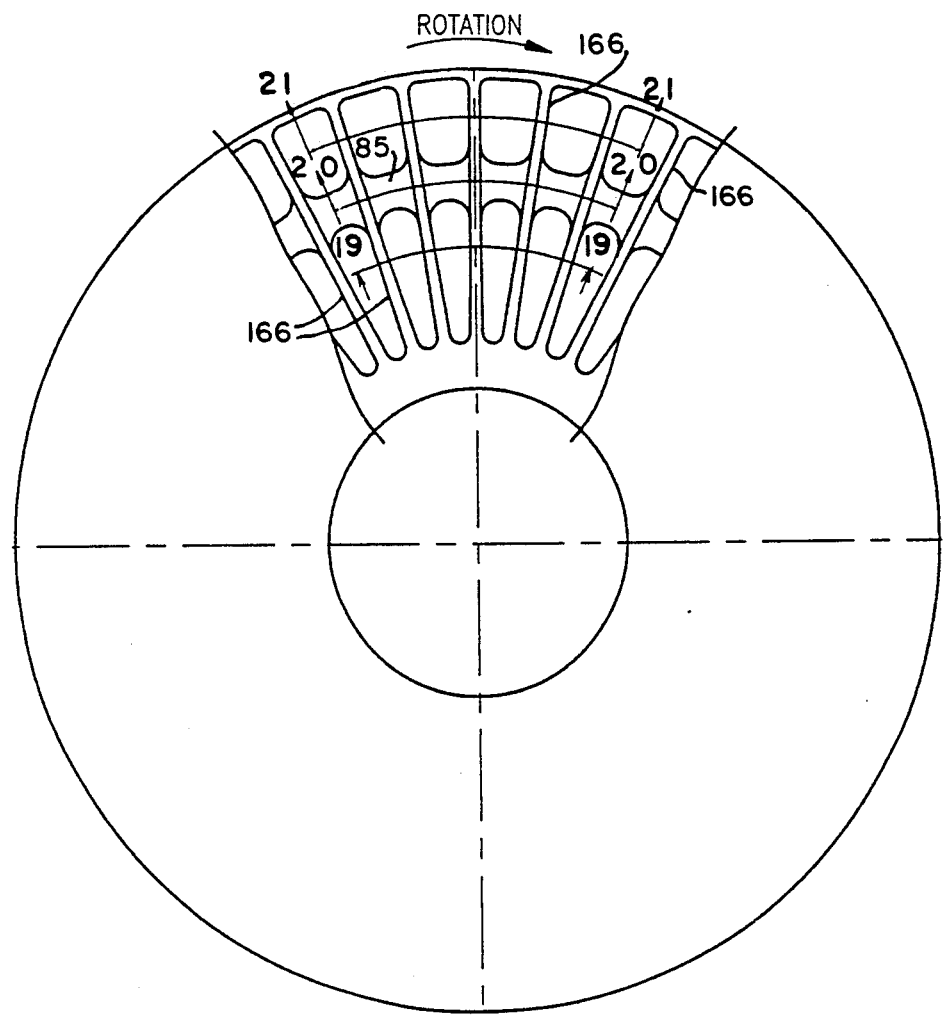
FIG. 18 is a view in front elevation of the face of an impeller in which the free edges of the vanes, which are shown fragmentarily, are purely radial, but where the vanes are twisted progressively radially.

FIGS. 10 through 16 illustrate the impellers and runners of conventional fluid drives of the type to which the present invention is applicable. FIGS. 10 through 12, illustrate an American Standard fluid drive; FIGS. 13 through 16, illustrate a fluid drive manufactured by Voith Turbo GMBH & Co. Both these conventional drives and the drive of the present invention are designed to transmit varying amounts of power from a steam turbine or motor driven output shaft that rotates at a constant rate, for example, 3,600 rpm, to an output shaft to a boiler feed water pump the rotative speed of which is expected to be in the range between approximately 3,500 rpm and 800 rpm, although it can be as low as 100 rpm. While gears can be used to increase or decrease the speeds and power transmitted, the essence remains the same. All of them have certain elements in common. Each has an input shaft 2 with a flange 10 to which an impeller 3 is mounted, as by means of cap screws 14, and an output shaft 6, with an annular flange 12, on which a runner 7 is mounted as by means of cap screws 14. As has been explained above, in practice, the impeller and runner are enclosed in a casing that is fixedly connected to the input shaft, so that the casing and impeller rotate at the same speed. A scoop tube extends into the casing on the output side of the runner and is arranged to be moved selectively radially of the casing by means of a positioner. Illustrations and description of that arrangement may be found my copending application Ser. No. 998959. The casing and scoop tube form no part of this invention, and are not illustrated so as to simplify the illustration of the essential parts of this invention.

Circulating oil is introduced to the impeller and runner in either of two ways. These are illustrated in FIGS. 1 and 2, and 10 and 13, respectively. As shown in FIGS. 1 and 10, the oil may be introduced through one passage 16 in and concentric with the input shaft, which opens through the free end of the input shaft, passing through the passage 16 into a chamber defined by the ends of the shafts 2 and 6, through a gap 20 between the impeller and the runner. In practice, a plurality of passages, symmetrically arranged concentrically with the axis of rotation of the shaft may be used, to the same end. The other conventional way of introducing the circulating oil is through oil feed passages 17 extending from a collection ring 18 through a shroud 8 of the impeller 3, as illustrated in FIGS. 2 and 13.

The circulating oil in either construction is discharged through the gap between the impeller and the runner, and, if they are used, in part through discharge ports 30 in a runner shroud 9.

FIGS. 13 through 16 illustrate an impeller with pockets 22 and a runner with pockets 23, neither of which has a reinforcing member of any sort intermediate the radial length of impeller vanes 26 or runner vanes 27. The pockets 22 and 23 are substantially semi-circular, and the vanes, of uniform width both radially and axially. In FIG. 15, as in all of the corresponding Figures, only a segment of the vanes is illustrated. They extend completely around the impeller, symetrically and uniformly. In this, Voith, device, the impeller vanes' free edges are formed in a sharp Vee 52, and the arris between the sloping sides of all of the vanes lies in a common plane in which the axial innermost edge of the impeller shroud 8 also lies, as shown in FIGS. 13 and 14.

However, a shroud 9 of the runner has a lip 50, also formed as a sharp Vee, which projects a short distance (for example, ⅛ of an inch (3.175 mm)) beyond the plane of the free edges of the vanes of 27 of the runner 9, as shown in FIGS. 13 and 14.

In the American-Standard device shown in FIGS. 10 through 12, can be of either the shaft feed type shown in FIG. 10 or the shroud passage type shown in FIG. 13, the runner vanes are formed with a load ring notch 32, stepped in a hub section 28, to receive a load ring 34, which projects into the pockets 23 a substantial distance, as for example 1 inch. The load ring 34 is mounted to the end of the output shaft 26 by means of cap screws 35. Except for the notch, the vanes 27 of the runner are uniform in height and their flat free edges lie in a plane in which the axially innermost edge of the shroud 9 lies. In this device, the vanes 26 of the impeller 3 have flat topped free edges, the radially outer and inner portions of which lie in a common plane, which is also common to the most axially inboard edge of the shroud 8, as shown in FIG. 10. Intermediate the radially inner and radially outer sections of the vanes, they are notched to form a reinforcing ring notch 40, to receive a reinforcing ring 42. The reinforcing ring 42 is also notched at regular intervals to receive end surfaces of the vanes within the notch 40. The reinforcing ring 42 is provided with tapped holes 44 to receive the threaded ends of bolts 46. Counterbored holes 45 in the shroud 8, receive the heads of the bolts 46. As has been indicated in the background of the invention, the bolts 46 are known to break or to work loose, and as can be appreciated, having a metal fragment between the impeller and the runner is invariably going to produce considerable damage. The pockets of the impeller and of the runner are substantially semi-circular, and the vanes are substantially uniform in section in both the radial and axial directions.

In all of FIGS. 1-17, the impellers and runners are shown as having vanes which are purely radial, purely symmetrical about a radial centerline, and purely perpendicular to the faces.

Referring now to FIGS. 1 through 9, reference numeral 60 indicates an impeller-runner assembly of this invention. The assembly 60 of FIG. 2 is of the type in which the circulating oil is introduced through passages 17 in the impeller shroud, and FIG. 1 is of the type in which oil is introduced through one central passage or multiple passages in the input shaft 2. The invention will be described in terms of FIG. 1, but it will be understood that the only difference between the assembly of FIG. 1 and that of FIG. 2 is in the means of introducing the oil, which forms no part of this invention.

Impeller pockets 62 of this preferred embodiment differ from the impeller pockets 22 of the conventional device as shown, in that a bottom surface 71 of the pockets 62 does not describe a semi-circle. As has been apparent from the drawings, the vanes of all of the impellers, and runners, diverge from a hub section 28 to a rim section 29, so that the distance between the vanes increases from the hub to the rim. When a reinforcing ring such as the ring 42 in the device shown in FIGS. 10 through 12 is installed, the circulation around the ring, by virtue of the semi-circular shape of the bottom of the pocket and the flair of the pocket, is not uniform. The bottom surface 71 of the impeller pocket 62 is not semi-circular, but is formed in such a way that a greater cross-sectional area generally perpendicular to the oil flow is provided at the radially inner end of the pocket than is provided with a semi-circular form.

An important aspect of this invention is the provision of reinforcing spools 85, which, collectively, form a reinforcing ring, integral with the vanes 66 of the impeller. The impeller is machined from a one piece forging of alloy steel. In order to machine the spools 85 as they are shown in FIG. 4, a multi-axis CNC milling machine is used, preferably at least a five axis machine.

Each spool 85 has a relatively thin central reach 86, and, at the two ends of that reach, roots 87 integral with the vanes, and of a diameter greater than that of the central reach. Merely by way of illustration, in a pocket 7 inches (177.8 mm) long and 1¾ inches (44.50 mm) wide at the rim section, and ½ inch (12.70 mm) wide at the hub section, each spool can be 1 inch (25.4 mm) in diameter at the central section and 2 inches (50.8 cm) in diameter at the root, with a ½ inch (12.700 mm) radius between the center section and the root.

Instead of being of uniform thickness from the hub section to the rim section, the vanes in the preferred embodiment taper slightly, either uniformly or in steps, from the hub section to the rim section. Thus, if the width of the vane at the rim section is ¼ inch (6.350 mm), the width at the hub section can be 9/16 inch (14.287 mm). Similarly, the fillet between the vanes and the bottom surface of the pockets can be varied, for example, between a 0.281" (7.137 mm) radius at the rim section to a 0.345" (8.763 mm) radius at or near the hub section. The effective width of the vanes is by the same token be made to taper axially. The radii between the vanes and the radially outer ends of the pockets are generally larger than those of conventional machines.

In every form of the preferred embodiment, the vanes 66 of the impeller and vanes 67 of the runner are rounded at their free edges, preferably on a radius one-half the width of the upper edge before it is rounded. Thus, if the vane is ¼ inch (6.350 mm) wide the free edges will be rounded on an ⅛ inch (3.175 mm) radius. Also, in each form, the shroud 8 of the impeller and the shroud 9 of the runner end at their facing edges in an impeller lip and a runner lip, respectively, each projecting beyond the plane defined by the free edges of the vanes 66 and 67 respectively, as shown in various forms in FIGS. 6 through 9. In the first preferred embodiment, as shown in FIG. 6, a lip 94 with a somewhat concave aspect is provided on the impeller shroud 8, and a convexly rounded lip 95 on the runner shroud 9. The impeller shroud lip is complementary to at least a part of the runner shroud lip. This arrangement makes for a semi-labyrinth passage 120 which can be made as restrictive as desired, either by increasing the labyrinth characteristics of the passage or by making the passage narrower. The latter is limited by the expected relative axial and radial movements or vibrations of the impeller and runner, which can be minimized, but not totally eliminated.

In FIG. 9, lips 97 are both convexly rounded. In FIG. 8, an impeller shroud lip 98 is square, while a runner shroud lip 99 is convexly rounded, and in FIG. 7, lips 100 of impeller shroud and runner shroud are both square. Even the "square" lips are chamfered or rounded very slightly to provide a more even flow of oil through the gap that they define. The rounded lips, like the rounded edges of the vanes, are preferably rounded on a radius of about half the width of the lip.

The rounding of the free edges of the impeller and runner vanes has certain advantages, even in a construction in which no reinforcing ring is provided, as shown in FIG. 5. As has been indicated in the discussion in the background of the invention, the problem of the vibration of the vanes in response to the jet pulsing effect is a severe one. The provision of the lips on both the impeller and the runner, which permits the gap between the vanes of the impeller and runner to be increased, coupled with rounding of the facing edges of the vanes of the impeller and the runner produces a smoother oil flow, hence smoother operation, which is less fatiguing to the vanes, than conventional machines.

Another feature of the preferred embodiment is the forming of the pockets of the runner with a bottom surface at its radially lower end on a circle with a greater radius from the axis of rotation of the input and output shafts than the bottom surface of the impeller. Such an arrangement, shown in FIGS. 1 and 2, accomplishes the object of the load ring, but with less turbulence, and less potential problems, because it eliminates the need for a separate load ring.

As has been discussed in the background of the invention, the circulating oil has its greatest velocity along the bottom surface of the impeller at the rim section. Oil that is discharged through the gap is thus oil with the greatest effective energy. By making the gap small, and discharging oil through the discharge ports 30 at a place at which the oil has given up at least a portion of its energy, the efficiency of the device is increased. As the oil moves along the bottom surface of the runner pockets 63, it loses more of its energy, and therefore, when it crosses the gap 20 and moves into the pocket of the impeller, there is a sudden acceleration, which places a substantial strain on the vanes.

It will be observed that the position of the spools 85 is closer to the rim section than to the hub section. This has to do in part with the circulation pattern developed when the impeller and runner cavities are partially filled, that is, at a reduced output shaft speed. In this case, the pockets are not filled with the oil, so that the oil is spaced radially outwardly from the bottom of the pockets at the hub section, as shown in FIG. 17. The condition under which the service is most severe is when the fluid drive ouput shaft rotates at approximately two-thirds the speed of the input shaft. Under these circumstances, the transfer of the oil from the runner pocket to the impeller pocket occurs at some distance from the hub, at which location the jet pulsing effect of the oil on the vane occurs. The placement of the spool thus reinforces the vane in the area in which it is most vulnerable.

Using the multi-axis CNC milling machine under three-dimensional programmed computer control, the vane structure of the impellers and runners can be made having vanes that are at an angle, curved, twisted, with or without a reinforcing ring, with not much more difficulty than is involved in making impellers and runners with perpendicular planar vanes. Such vanes can optimize the performance of a fluid drive.

Figure 19:
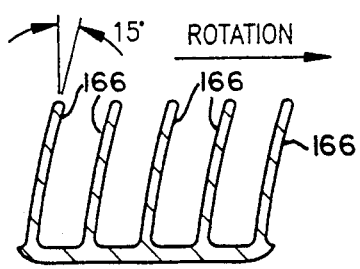
FIG. 19 is a sectional view taken along the line 19—19 of FIG. 18.
Figure 20:
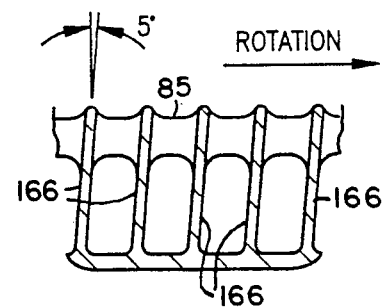
FIG. 20 is a sectional view taken along the line 20—20 of FIG. 18.
Figure 21:
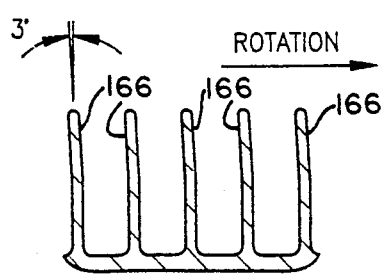
FIG. 21 is a sectional view taken along the line 21—21 of FIG. 18.

Referring now to FIGS. 18-21, for an example of a "twisted" blade structure, vanes 166 extend radially; however, as shown in FIG. 19, the vanes lean from the perpendicular in the direction of rotation by fifteen degrees on the hub section side of the spools 85, by five degrees at the spools, and away from the direction of rotation by three degrees on the rim section side of the spools. Although this illustrates one of the many ways in which the vanes and pockets can be modified by the use of a multi-axis CNC milling machine with at least five axes, these particular dimensions provide excellent flow characteristics, Numerous variations in the construction of the device of this invention within the scope of the appended claims will occur to those skilled in the art in the light of the foregoing disclosure. The invention has been described as applied to a single circuit fluid drive. It is equally applicable to a dual circuit fluid drive, in which two impellers and two runners are used. In such an arrangement, the scoop tube is mounted on the back of the impeller, rather than the runner as was described in connection with the single circuit drive. An alternative method for making impeller and runner pockets that can have many, if not all, of the design characteristics of the pockets made with the CNC process is to use an Electro Discharge Machining (EDM) process. However, it has one characteristic that is particularly troublesome for the severe duty applications to which this invention is addressed: The EDM process leaves a "Micro-crack" surface condition only a few thousandths of an inch deep, that must be removed for use in severe duty vibration conditions, because cracks have been known to emanate from these micro-cracks, becoming sufficiently large as to cause failure, and to do so at a rather rapid rate. Various methods including acid etching have been used to remove this micro-crack structure, also known as "recast" layer, but these are not always reliable, and have environmental concerns. Conceivably, if a future method is developed to remove the micro-crack structure in a reliable manner, this method holds promise. The reinforcing spools can be made elliptical in cross section, rather than circular, or, if the shape of the pocket so dictates, assymetrical. More than one reinforcing element can be provided per pocket, in concentric rings, for example, in which case each can be made thinner. In the embodiment in which one lip is convex and one concave, the concave lip can be put on the runner, although the flow pattern may not be as advantageous. The thickness of the vanes can be varied uniformly, or in steps, according to a monotonically increasing function, or in a combination of these ways in a step-wise manner. The fillet at the intersection of the surface of a vane and the pocket bottom preferably varies in proportion to the distance from the free edge of the vane, but the fillet radius can be varied otherwise, to suit particular applications. The departure of the vanes from the perpendicular with respect to a plane defined by the free edges of the vanes can take various forms, being at an angle to the face, at an angle to a radius, twisted, or curved, all of which are embraced in the expression "deviating from the perpendicular" as used herein. These are merely illustrative.

I claim:

1. In a fluid drive system in which an impeller rotated by an input shaft drives a runner mounted on an output shaft through a fluidic coupling, said fluid drive system transmitting at least 1,000 horsepower per impeller-runner pair at a nominal input speed of at least 3,000 revolutions per minute and being subjected to severe duty application, said impeller and said runner having radially elongated pockets defined by a bottom surface and vanes by which said pockets are separated, the improvement comprising reinforcing elements, integral with said vanes of said impeller, spanning each pocket and being clear of said bottom surface, said impeller being made of forged alloy steel and said pockets, said vanes, and said reinforcing elements being machined from a single blank of said forged alloy steel.

2. In a fluid drive system in which an impeller rotated by an input shaft drives a runner mounted on an output shaft through a fluidic coupling, said impeller and said runner having radially elongated pockets defined by a bottom surface and vanes by which said pockets are separated, the improvement comprising reinforcing elements, integral with said vanes of said impeller, spanning each pocket and being clear of said bottom surface, said impeller being made of forged alloy steel and said pockets and said reinforcing elements being machined from a single blank, using a multi-axis CNC milling machine.

3. The improvement of claim 2 wherein the vanes of said impeller depart from the perpendicular with respect to a plane defined by free edges of said vanes.

4. The improvement of claim 2, wherein said reinforcing elements are generally circular in cross-section.

5. The improvement of claim 2, wherein said reinforcing elements are generally elliptical in cross-section.

6. The improvement of claim 2, wherein the thickness of the vanes increases in a direction radially inwardly towards a hub section.

7. The improvement of claim 6, wherein the thickness of the vanes increases from the free edge in a way comprising one of (a) uniformly, (b) in steps, (c) according to a monotonically increasing function, or (d) a combination of these ways in a step-wise manner.

8. The improvement of claim 2, wherein the radius of a fillet at the intersection of the surface of each vane and the pocket bottom varies, with the variation generally in proportion to the distance from the free edge.

9. The improvement of claim 2, wherein the reinforcing elements are closer radially to a radial outer end of said pockets than to the radially inner end thereof.

10. The improvement of claim 2, wherein more than one of said reinforcing elements is provided.

11. The improvement of claim 2, wherein radially extending free edges of said vanes are rounded on a radius generally half the thickness of the vane at its free edge before it is rounded.

12. In a fluid drive system in which an impeller rotated by an input shaft drives a runner mounted on an output shaft through a fluidic coupling, said impeller and said runner having radially elongated pockets defined by a bottom surface and vanes by which said pockets are separated, the improvement comprising reinforcing elements, integral with said vanes of said impeller, spanning each pocket and being clear of said bottom surface, said impeller being made of forged alloy steel and said pockets, said vanes, and said reinforcing elements being machined from a single blank, radially extending free edges of said vanes being rounded on a radius generally half the thickness of a vane at its free edge before it is rounded.

13. In a fluid drive system in which an impeller rotated by an input shaft drives a runner mounted on an output shaft through a fluidic coupling, said impeller and said runner having radially elongated pockets defined by a bottom surface and vanes by which said pockets are separated, the improvement comprising generally radially extending vanes the free edges of which are rounded on a radius generally half the thickness of the vane at its free edge before it is rounded, wherein said impeller is made of forged alloy steel and said pockets and said reinforcing elements are machined from a single blank, with each entire pocket and said rounding being machined on a multi-axis CNC milling machine.

14. In a fluid drive system in which an impeller rotated by an input shaft drives a runner mounted on an output shaft through a fluidic coupling, said impeller and said runner having radially elongated pockets defined by a bottom surface and vanes by which said pockets are separated, the improvement comprising an annular seal lip integral with and extending around a rim section of the impeller, said lip projecting axially beyond a plane defined by a free edge of said vanes, an annular seal lip integral with and extending around a rim section of the runner projecting axially beyond a plane defined by a free edge of said vanes, toward and coaxial with said lip of said impeller, the runner lip being convexly rounded and the impeller lip having a concave portion complementary to at least a portion of said convexly rounded runner lip.

15. In a fluid drive system in which an impeller rotated by an input shaft drives a runner mounted on an output shaft through a fluidic coupling, said impeller and said runner having radially elongated pockets defined by a bottom surface and vanes by which said pockets are separated, the improvement comprising an annular seal lip integral with and extending around a rim section of the impeller, said lip projecting axially beyond a plane defined by a free edge of said vanes, an annular seal lip integral with and extending around a rim section of the runner projecting axially beyond a plane defined by a free edge of said vanes, toward and coaxial with said lip of said impeller, both of said lips being convexly rounded on a radius generally one half of the width of the lip before it is rounded.

16. In a fluid drive system in which an impeller rotated by an input shaft drives a runner mounted on an output shaft through a fluidic coupling, said impeller and said runner having radially elongated pockets defined by a bottom surface and vanes by which said pockets are separated, the improvement comprising pockets of the runner having smoothly uninterrupted bottom surfaces at their radially innermost reach lying on a circle of a larger diameter than a circle on which bottom surfaces of the pockets of the impeller at their radially innermost reach lie.

17. In a fluid drive system in which an impeller rotated by an input shaft drives a runner mounted on an output shaft through a fluidic coupling, said impeller and said runner having radially elongated pockets defined by a bottom surface and vanes by which said pockets are separated, the improvement comprising said vanes being rounded at free edges, with a radius of approximately one-half the thickness of the vane.

18. The improvement of claim 17, wherein the rounding is performed using a multi-axis CNC milling machine.

19. In a fluid drive system in which an impeller rotated by an input shaft drives a runner mounted on an output shaft through a fluidic coupling, said impeller and said runner having radially elongated pockets defined by a bottom surface and vanes extending radially from a hub section to a rim section by which said pockets are separated, the improvement comprising said vanes having a free edge rounded on a radius generally half the thickness of the vane at its free edge before it is rounded, and an annular seal lip extending around a rim section of each of the impeller and runner, said lips projecting axially beyond a plane defined by said free edges of said vanes, said lips being coaxial and in direct confrontation with one another.

20. In a fluid drive system in which an impeller rotated by an input shaft drives a runner mounted on an output shaft through a fluidic coupling, said impeller and said runner having radially elongated pockets defined by a bottom surface and vanes extending radially from a hub section to a rim section by which said pockets are separated, the improvement comprising said vanes having a free edge rounded on a radius generally half the thickness of the vane at its free edge before it is rounded, and an annular seal lip extending around a rim section of each of the impeller and runner, said lips projecting axially beyond a plane defined by said free edges of said vanes, said lips being coaxial and in direct confrontation with one another, said impeller and said runner being made of forged alloy steel and said pockets and said lips being machined from a single blank, said lips being rounded on a radius approximately one-half the width of the lip before it is rounded, said pockets, vanes and lips and the rounding of said free edges and projecting lips being machined on a multi-axis CNC milling machine.

21. In a fluid drive system in which an impeller rotated by an input shaft drives a runner mounted on an output shaft through a fluidic coupling, said impeller and said runner having radially elongated pockets defined by a bottom surface and vanes by which said pockets are separated, the improvement comprising reinforcing elements, integral with said vanes of said impeller, spanning each pocket and being clear of said bottom surface, said impeller being made of forged alloy steel and said pockets and said reinforcing elements being machined from a single blank on a multi-axis CNC milling machine, said vanes deviating from the perpendicular with respect to a planar face of said impeller.

* * * * *